US008495924B2

(12) United States Patent
Fukano et al.

(10) Patent No.: US 8,495,924 B2
(45) Date of Patent: Jul. 30, 2013

(54) ELECTRIC ACTUATOR

(75) Inventors: Yoshihiro Fukano, Moriya (JP); Toru Sugiyama, Abiko (JP); Masaki Miyahara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 458 days.

(21) Appl. No.: 12/415,066

(22) Filed: Mar. 31, 2009

(65) Prior Publication Data
US 2009/0260463 A1 Oct. 22, 2009

(30) Foreign Application Priority Data
Apr. 17, 2008 (JP) ................................. 2008-107818

(51) Int. Cl.
*F16H 25/16* (2006.01)

(52) U.S. Cl.
USPC ........... 74/89.23; 74/89.39; 74/89.44; 254/98

(58) Field of Classification Search
USPC ............. 74/25, 89, 89.2, 89.21, 89.23, 89.33, 74/89.35, 89.36, 89.39, 89.44, 424.71; 254/98, 254/100, 102, DIG. 2, DIG. 8
See application file for complete search history.

(56) References Cited

U.S. PATENT DOCUMENTS

| 3,682,283 | A | * | 8/1972 | Sato | 192/141 |
| 4,137,784 | A | | 2/1979 | Griffin | |
| 4,334,688 | A | * | 6/1982 | Spargo et al. | 277/422 |
| 4,679,451 | A | * | 7/1987 | Nakamura | 74/606 R |
| 4,712,441 | A | * | 12/1987 | Abraham | 74/89.38 |
| 4,790,201 | A | * | 12/1988 | Gheddo | 74/89.37 |
| 4,858,481 | A | * | 8/1989 | Abraham | 74/89.38 |
| 4,889,002 | A | * | 12/1989 | Abraham | 74/89.38 |
| 5,461,935 | A | * | 10/1995 | Hill | 74/89.38 |
| 6,240,797 | B1 | * | 6/2001 | Morishima et al. | 74/89.39 |
| 6,655,225 | B1 | * | 12/2003 | Nagai et al. | 74/89.33 |
| 6,670,734 | B2 | * | 12/2003 | Morishima et al. | 310/80 |
| 6,756,707 | B2 | * | 6/2004 | Hochhalter et al. | 310/20 |
| 7,712,389 | B2 | * | 5/2010 | Wang | 74/89.23 |
| 2004/0093969 | A1 | * | 5/2004 | Nielsen | 74/89.23 |
| 2004/0251239 | A1 | * | 12/2004 | Hochhalter et al. | 219/86.1 |
| 2005/0103138 | A1 | * | 5/2005 | Chen et al. | 74/89.26 |
| 2005/0160846 | A1 | * | 7/2005 | Chiang | 74/89.35 |
| 2007/0169578 | A1 | * | 7/2007 | Christensen et al. | 74/89.37 |

FOREIGN PATENT DOCUMENTS

| DE | 31 18 805 C2 | 4/1986 |
| DE | 38 24 867 C1 | 10/1989 |
| DE | 298 16 790 U1 | 1/1999 |
| JP | 10-285867 | 10/1998 |
| WO | WO 2005/079134 A2 | 9/2005 |

\* cited by examiner

*Primary Examiner* — Matthew D Troutman
(74) *Attorney, Agent, or Firm* — Oblon, Spivak, McClelland, Maier & Neustadt, L.L.P.

(57) ABSTRACT

In an electric actuator, a connector is coupled to one end of a screw shaft that makes up a displacement mechanism, the screw shaft being rotatably supported by first and second bearings. Further, on the other end of the screw shaft, a support ring is disposed through a holder, wherein the support ring is slidable along an inner circumferential surface of a piston rod. On the outer circumferential surface of a piston, a rotation-stopping member is provided, which includes projections thereon that project in a radial direction from the outer circumferential surface, the projections being inserted into grooves of said body.

27 Claims, 16 Drawing Sheets

ELECTRIC ACTUATOR

BACKGROUND OF THE INVENTION

1. Field of the Invention

The present invention relates to an electric actuator, which displaces a displacement member by transmitting a drive force from a driving section to the displacement member through a screw shaft.

2. Description of the Related Art

Heretofore, as an apparatus for transporting a workpiece or the like, an electric actuator has widely been known, in which a feed screw is driven rotatably by a rotary drive force of a rotary drive source, such as a motor or the like, to thereby displace a slider that transports the workpiece.

For example, with the electric actuator 1 disclosed in Japanese Laid-Open Patent Publication No. 10-285867, as shown in FIG. 16, a motor 3 is coupled to an end of a housing 2 formed with a hollow shape, and an operating shaft 4 is inserted reciprocally through the interior of the housing 2. A feed screw shaft 6 is coupled through a coupling 5 to the motor 3, and a nut 7 is screw engaged over the feed screw shaft 6. Additionally, as a result of the nut 7 being accommodated inside the operating shaft 4 and engaged therewith, the feed screw shaft 6 is rotated by driving the motor 3, accompanied by the nut 7 and the operating shaft 4 being moved forward and backward in the axial direction.

However, in the aforementioned conventional technique, the feed screw shaft 6 is supported at one location only by a bearing 8 on one end side where the motor 3 is located. Since the other end side of the feed screw shaft 6 on the side of the housing 2 forms a free end, in the event that the length of the feed screw shaft 6 in the axial direction is long, there is a concern that the other end side will become inclined and off-centered. As a result, vibrations are generated when the feed screw shaft 6 is rotated at high speeds.

Further, although on the one end side of the feed screw shaft 6, a location is provided which is supported by the bearing 8, in the electric actuator 1, the length of the feed screw shaft 6 differs corresponding to the stroke amount (stroke length) of the electric actuator 1 in the axial direction. Along therewith, since the support location by the bearing 8 also differs, in each case, it is necessary to undertake processing corresponding to the stroke amount, which leads to complications. Further, it is necessary to prepare ahead of time various feed screw shafts 6 having different lengths. Consequently, productivity (ease in manufacturing) of the electric actuator 1 including the feed screw shaft 6 thereof is adversely affected and lowered.

Furthermore, upon rotation of the feed screw shaft 6, when the nut 7 is displaced along the axial direction inside the housing 2, there is a concern that the nut 7 will be rotated together with the feed screw shaft 6.

SUMMARY OF THE INVENTION

A general object of the present invention is to provide an electric actuator in which displacement in a rotational direction of a displacement member when the displacement member is displaced is reliably prevented, and further wherein off-centering of the feed screw shaft is prevented, thus enabling the displacement member to be displaced with high precision, together with enhancing productivity of the electric actuator.

The electric actuator according to the present invention is characterized by a body, a driving section driven rotatably under supply of an electric current thereto, a drive force transmission mechanism connected to the driving section for transmitting a drive force from the driving section, a displacement mechanism disposed on the body and including a screw shaft, which is rotatably displaced by the drive force transmitted through the drive force transmission mechanism, and a displacement member, which is screw-engaged with the screw shaft and displaced along an axial direction of the body, a connecting member coupled to one end of the screw shaft and connected to the drive force transmission mechanism, a support mechanism for supporting the screw shaft in a radial direction, and a rotation regulating mechanism disposed on an outer circumferential surface of the displacement member, which is engaged in a groove of the body and regulates rotational displacement of the displacement member. In the present invention, the support mechanism is disposed on another end of the screw shaft.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
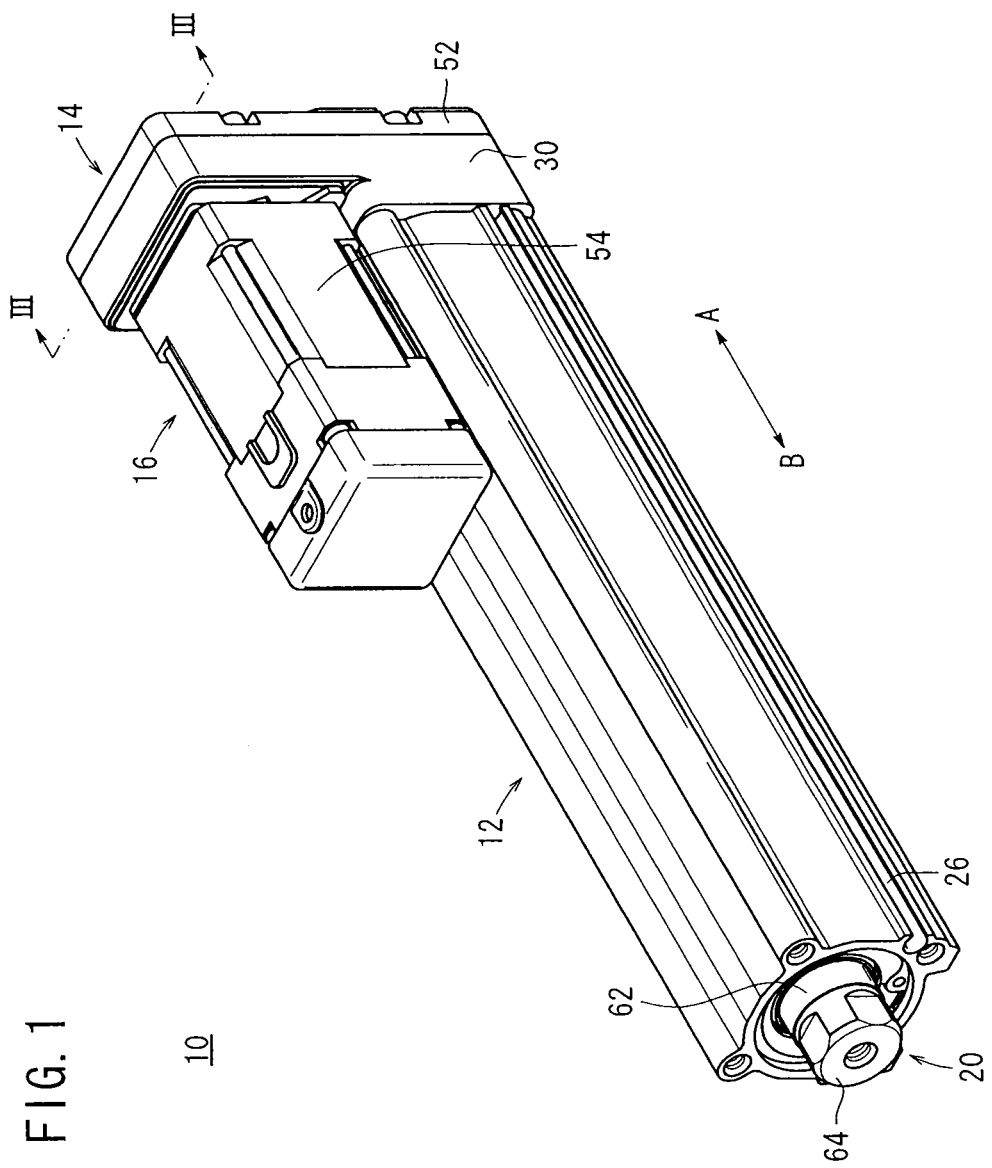
FIG. 1 is an exterior perspective view of an electric actuator according to a first embodiment of the present invention.

In FIG. 1, reference numeral 10 designates an electric actuator according to a first embodiment of the present invention.

Figure 2:
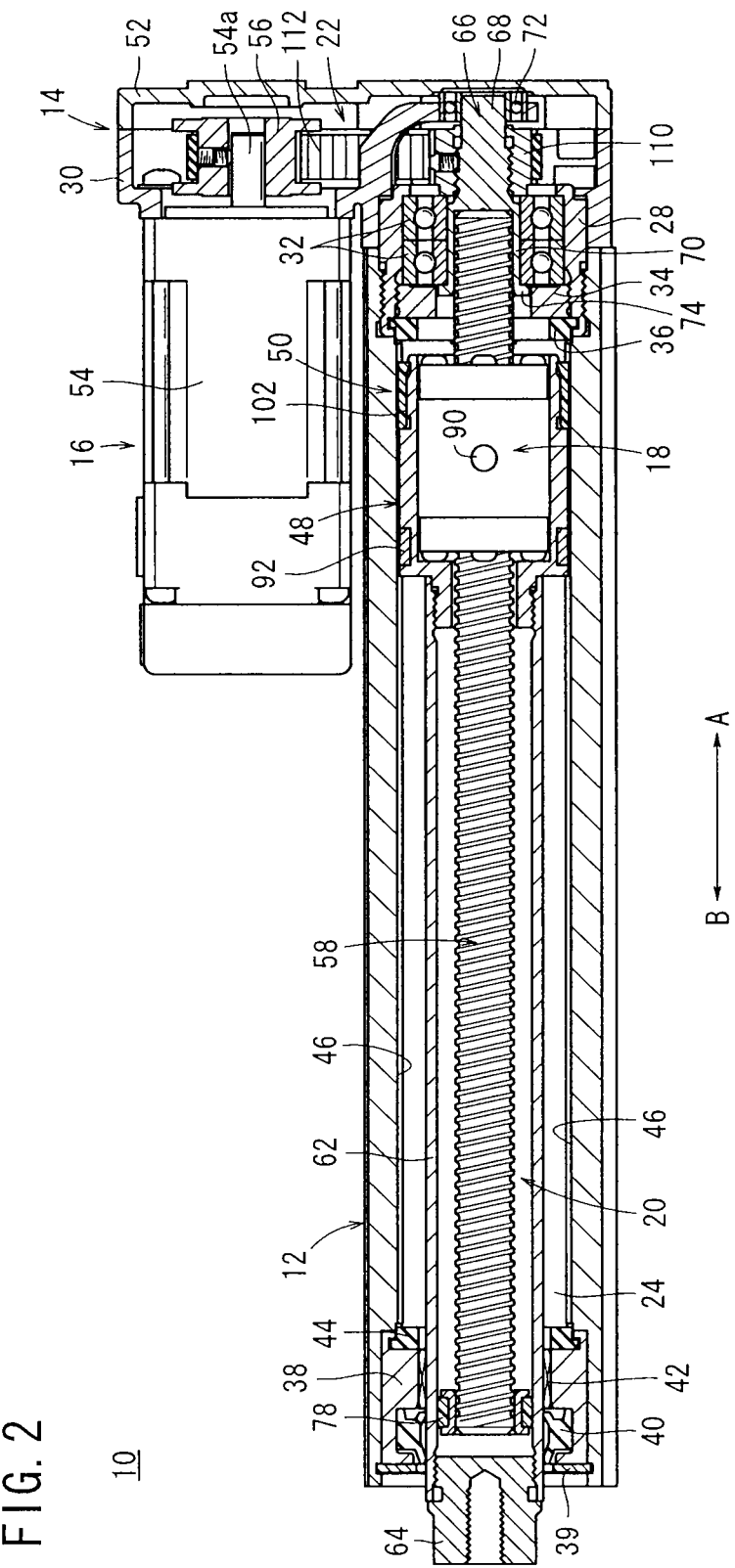
FIG. 2 is an overall cross sectional view of the electric actuator shown in FIG. 1.
Figure 3:
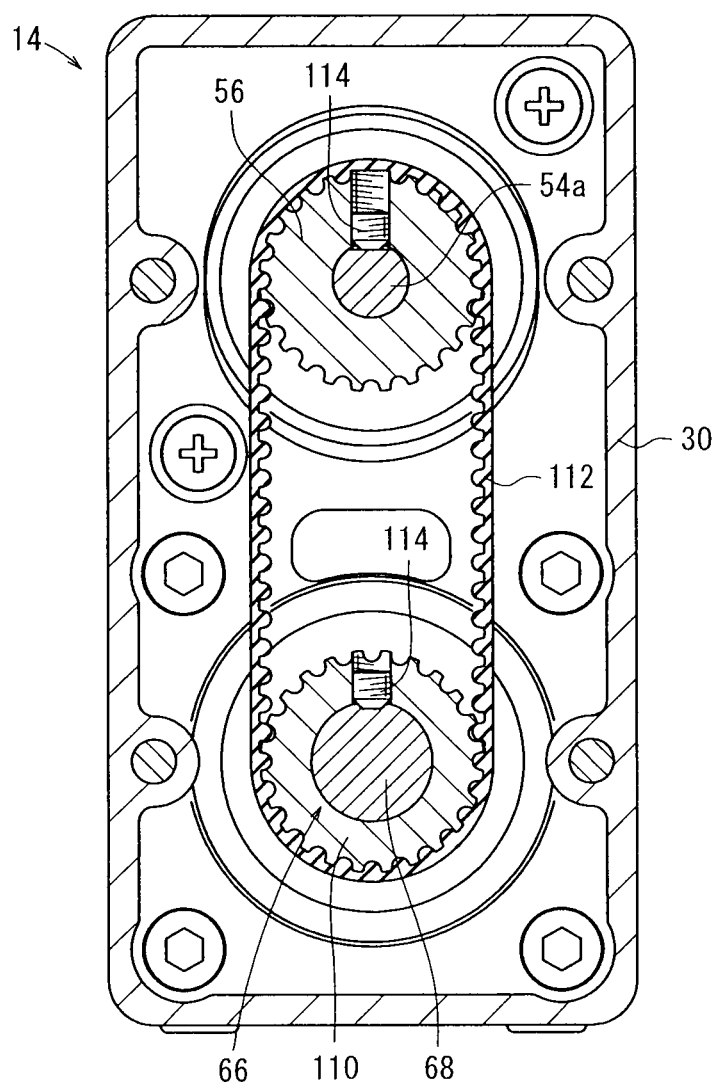
FIG. 3 is a cross sectional view taken along line III-III of FIG. 1.

As shown in FIGS. 1 to 3, the electric actuator 10 comprises an elongate body 12 extending along the axial direction (the direction of arrows A and B), a cover unit 14 coupled to one end of the body 12, a driving section 16 disposed substantially parallel to the body 12 and which is rotatably driven by an electric signal supplied thereto, a displacement mechanism 20 disposed in the interior of the body 12 and having a displacement nut 18, which is capable of being displaced over a given stroke by a drive force from the driving section 16, and a drive force transmission mechanism 22 that transmits the drive force from the driving section 16 to the displacement mechanism 20.

A hole 24 that opens with a circular shape in cross section penetrates along the axial direction (the direction of arrows A and B) of the body 12, and on the outer circumferential surface of the body 12, a plurality of sensor attachment grooves 26 are provided, which extend along the axial direction.

A housing 28 is screw-engaged with one end of the body 12, and an adapter 30 of the cover unit 14, which interconnects the body 12 and the driving section 16, is disposed on one end of the body 12 through the housing 28. Inside the housing 28, a pair of first bearings 32 is disposed in parallel and the first bearings 32 are latched therein by a bearing holder 34, which is screw-engaged with the housing 28. By this arrangement, the first bearings 32 are retained in the interior of the housing 28.

Further, a first damper 36 is installed on one end of the housing 28 adjacent to the bearing holder 34. The first damper 36 is made from an elastic material, for example, rubber, urethane or the like, and is disposed to face toward the other end side (in the direction of arrow B) of the body 12.

On the other hand, on the other end of the body 12, a cylindrically shaped rod cover 38 is accommodated inside the hole 24, the rod cover 38 being latched in place in the axial direction (the direction of arrows A and B) by a stop ring 39, which engages with a step of the hole 24. A rod packing 40 and a bush 42, which are disposed in sliding contact with a later-described piston rod 62, are disposed on an inner circumferential surface of the rod cover 38, and a second damper 44 made from an elastic material (e.g., rubber, urethane) is installed facing toward the one end side of the body 12.

Figure 12:
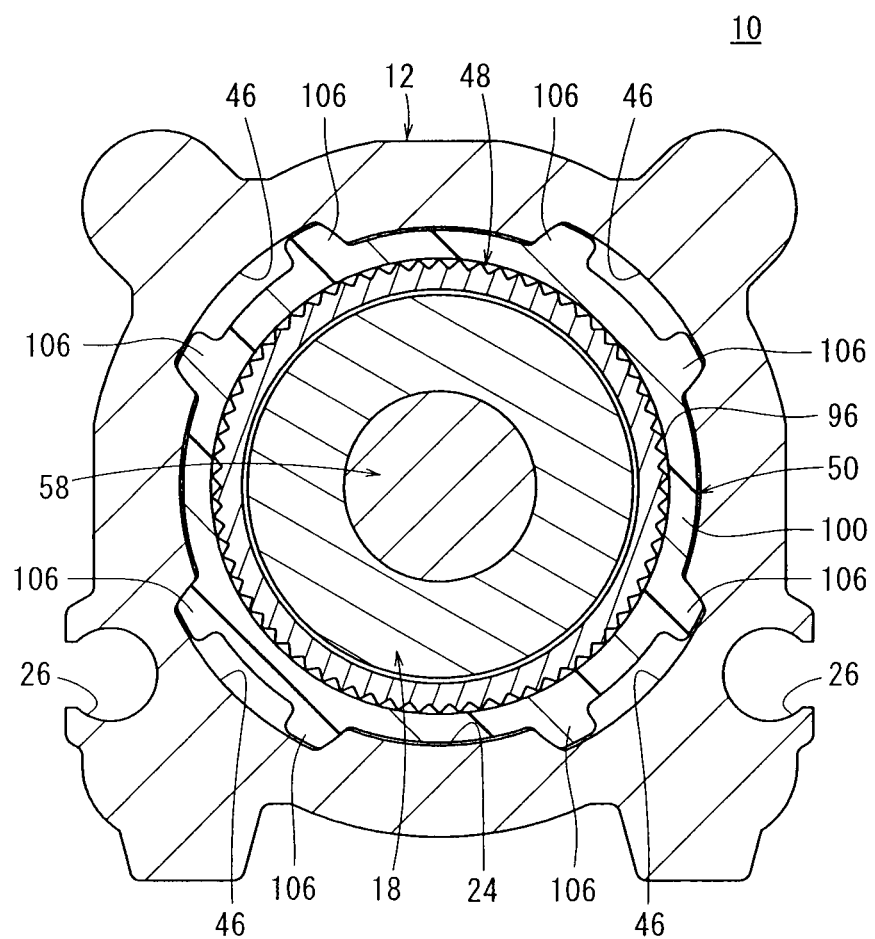
FIG. 12 is a sideways cross sectional view showing the vicinity of the support ring and a holder in the electric actuator of FIG. 2.

Grooves 46, which are recessed in a radial direction and extend along the axial direction, are formed on an inner circumferential surface of the hole 24. A rotation-stopping member (rotation regulating mechanism) 50, which is provided on a piston (displacement member) 48 of a later-described displacement mechanism 20, is inserted into the groove 46. The grooves 46 are disposed in a plurality (e.g., four) and are separated by equal intervals along the circumferential direction on the inner circumferential surface of the hole 24 (see FIG. 12).

The cover unit 14 includes a hollow adapter 30 which connects one end of the body 12 and an end of the driving section 16, and accommodates the drive force transmission mechanism 22, and a pulley cover 52 that closes and blocks an opening of the adapter 30. More specifically, the body 12 and the driving section 16 are connected substantially in parallel mutually via the cover unit 14 (see FIG. 2).

The driving section 16, for example, is made up from a rotary drive source 54 comprising a DC motor, a stepping motor or the like, which is driven rotatably by an electric current supplied thereto from a non-illustrated power source. The driving section 16 is coupled with the one end of the body 12 through the adapter 30, which is formed on an end of the driving section 16, and a drive pulley 56 of the drive force transmission mechanism 22 is installed onto a drive shaft 54a of the driving section 16.

The displacement mechanism 20 includes a screw shaft 58 accommodated inside the body 12, the displacement nut 18, which is screw-engaged with the screw shaft 58, a piston 48 installed on an outer circumferential side of the displacement nut 18, a piston rod 62 connected to an end of the piston 48, and a socket 64 that closes and blocks the end of the piston rod 62.

The screw shaft 58 is formed with a longitudinal dimension along the axial direction (the direction of arrows A and B) with screw threads engraved on an outer circumferential surface thereof. One end of the screw shaft 58 is disposed at the one end side (in the direction of arrow A) of the body 12, with a connector (connecting member) 66 being coupled to this end of the screw shaft 58.

Figure 4:
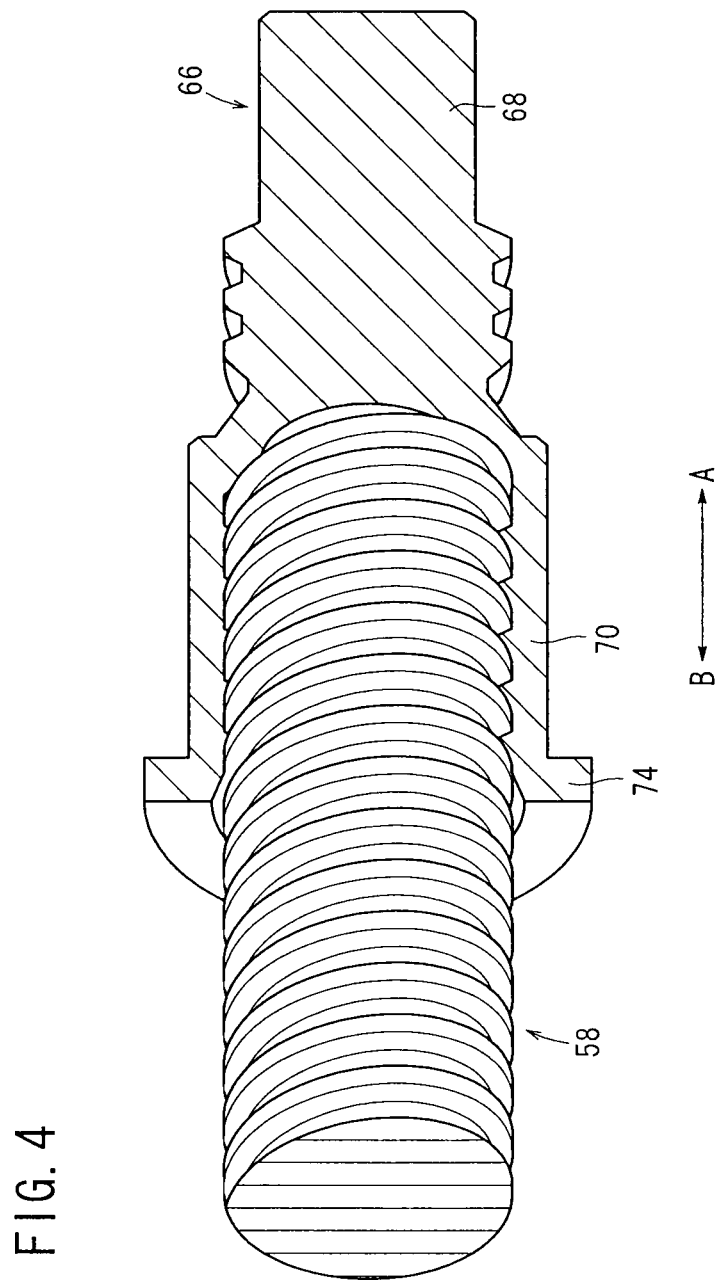
FIG. 4 is an enlarged perspective view, partially cutaway, showing the vicinity of a connector disposed on one end of a screw shaft.

As shown in FIGS. 2 and 4, the connector 66 is made up from a metallic material formed, for example, by a cutting process, forging, a plastic working process, or the like. Further, the connector 66 includes a shaft 68 and a tubular member 70 formed in a cylindrical shape adjacent to the shaft 68. One end of the screw shaft 58 is inserted and connected by shrink-fitting into the interior of the tubular member 70. For example, in the case that the screw shaft 58 and the connector 66 are coupled together by shrink-fitting, after the connector 66 has been heated to a temperature of roughly 100° C. to 350° C., the screw shaft 58 at normal room temperature is inserted into the connector 66, whereupon shrink-fitting thereof is carried out (i.e., the connector 66 shrinks upon cooling thereof to secure the screw shaft 58 therein). Consequently, the connector 66 can be connected easily and firmly with respect to the screw shaft 58.

Further, the method for connecting the screw shaft 58 and the connector 66 is not limited to the aforementioned shrink-fitting technique. For example, the screw shaft 58 may be coated with an adhesive agent and press-fitted into the tubular member 70 for connection therewith. In this manner, the screw shaft 58 can be firmly connected to the tubular member 70 through the adhesive.

The outer circumferential side of the tubular member 70 is supported rotatably by the first bearings 32, which are disposed respectively in the body 12 and the adapter 30, and together therewith, the shaft 68 is supported rotatably by a second bearing 72, which is disposed in the adapter 30. Further, a driven pulley 110 constituting part of the drive force transmission mechanism 22 is screw-engaged with and connected to the shaft 68. The second bearing 72 is separated at a predetermined distance from and disposed coaxially with respect to the first bearings 32. More specifically, via the connector 66, the one end of the screw shaft 58 is supported rotatably by the first and second bearings 32, 72.

Further, the connector 66 includes a flange 74 thereon, which is expanded radially outward and confronts an end of the tubular member 70, the flange 74 abutting against a side surface of the first bearings 32. Owing thereto, the first bearings 32 are sandwiched between the flange 74 and an end of the housing 28, so that the first bearings 32 are accommodated and retained inside the housing 28. At this time, displacement of the first bearings 32 in the axial direction (the direction of arrow B) is regulated.

Stated otherwise, the flange 74 functions as a stopper, which is capable of regulating displacement of the first bearings 32 along the axial direction, while the first bearings 32 are retained between the housing 28 and the flange 74 of the connector 66.

Figure 5:
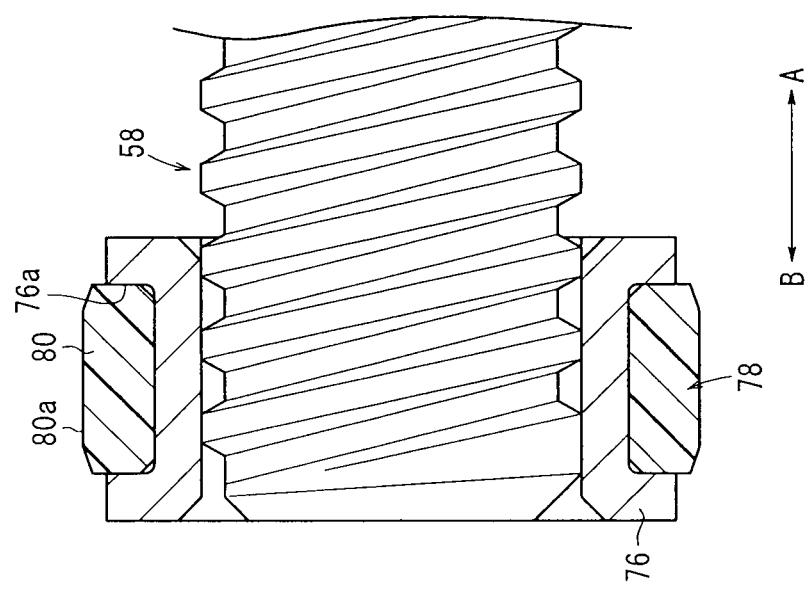
FIG. 5 is an enlarged cross sectional view in the vicinity of a support ring disposed on another end of the screw shaft.

On the other hand, the other end side (in the direction of arrow B) of the screw shaft 58 is inserted into the interior of the piston rod 62, and an annular shaped support ring (ring body) 78 is disposed through a holder 76 onto the end of the screw shaft 58 (see FIG. 5). The support ring 78 and the holder 76 function collectively as a support mechanism, which supports the other end of the screw shaft 58 in the radial direction.

The holder 76, in a similar manner as the aforementioned connector 66, is installed, for example, by shrink-fitting with respect to the outer circumferential side of the screw shaft 58. Further, the method for connecting the holder 76 to the screw shaft 58 is not limited to the aforementioned shrink-fitting technique. For example, the screw shaft 58 may be affixed by press-fitting into the holder 76, or the screw shaft 58 may be coated with an adhesive agent and then press-fitted into the holder 76 to become fastened and secured therewith.

Figure 6:
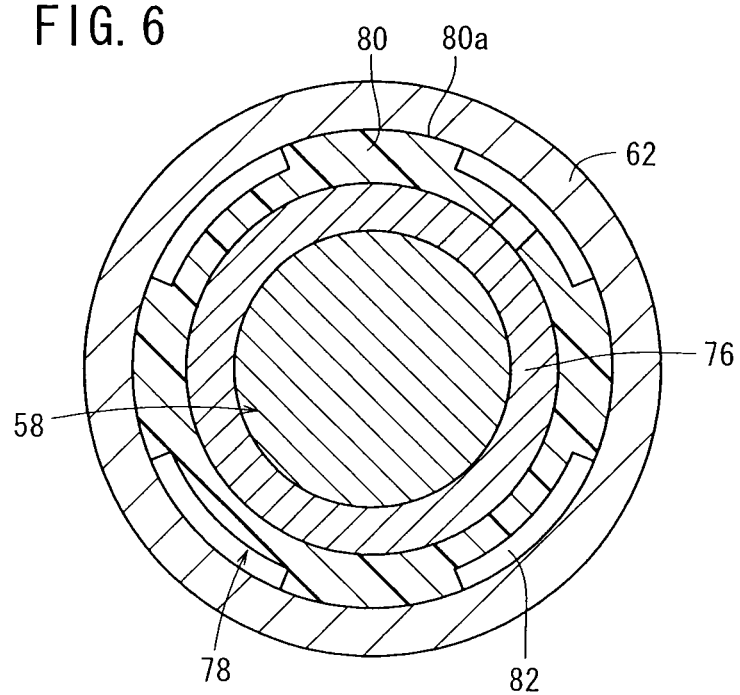
FIG. 6 is a sideways cross sectional view showing the vicinity of the support ring and a holder shown in FIG. 5.

As shown in FIG. 5, a concave groove 76a in which the support ring 78 is installed is included on the outer circumferential surface of the holder 76. The support ring 78, as shown in FIGS. 5 and 6, is formed in a radial expandable fashion, and is fitted into the groove 76a of the holder 76 and disposed rotatably along the groove 76a. In addition, as shown in FIG. 6, the support ring 78 includes a plurality of support members 80 that project radially outward from the outer circumferential surface of the holder 76. The support members 80 are spaced at equal intervals along the circumferential direction of the support ring 78.

More specifically, the outer circumferential surface of the support ring 78 is formed in an uneven (concave/convex) shape having a plurality (for example, four) support members 80 thereon.

Additionally, the support members 80 are placed in sliding contact with the inner circumferential surface of the piston rod 62, such that the piston rod 62 is supported displaceably along the axial direction (the direction of arrows A and B), and wherein one end side (in the direction of arrow A) and the other end side (in the direction of arrow B) of the body 12 communicate through spaces 82 formed between adjacently disposed support members 80.

Further, when the piston 48 is displaced along the interior of the body 12, since air inside of the piston rod 62 can flow freely through the support ring 78 from one end side to the other end side (in the direction of arrow B) of the body 12, displacement resistance of the piston 48, which would otherwise occur in the presence of such a sealed space, can be prevented.

On the support members 80, the cross section of the sliding surfaces 80a, which make sliding contact with the piston rod 62, is formed in an arcuate or tapered shape along the axial direction of the support ring 78. Owing thereto, sliding resistance occurring when the piston rod 62 moves slidably along the support members 80 can be lessened, and together therewith, a lubricant such as grease or the like used in the vicinity of the support ring 78 can suitably be taken in toward the sliding surfaces 80a of the support members 80.

Figure 7:
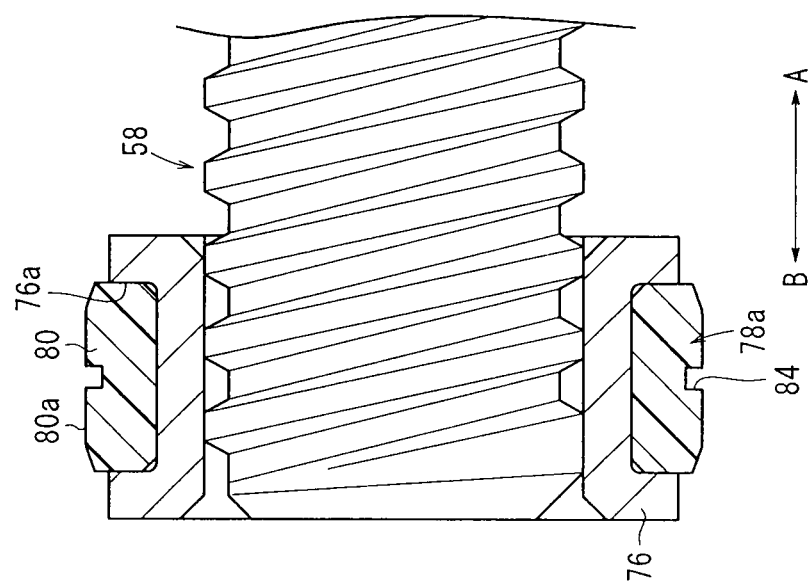
FIG. 7 is an enlarged cross sectional view showing a modified example of a support ring in which a lubricant groove is provided on an outer circumferential surface thereof.

Further, as shown in FIG. 7, a lubricant groove 84 having an annular shape along the circumferential direction may be provided on the outer circumferential surface of the support ring (ring body) 78a, wherein a lubricant such as grease or the like is filled in the lubricant groove 84. In this case, since the lubricant is suitably applied to the outer circumferential surface of the support ring 78a as well as to the inner circumferential surface of the piston rod 62, resistance when the piston rod 62 is slidably supported by the support ring 78a is lowered, and the piston rod 62 is capable of being smoothly displaced. The lubricant groove 84 may also be disposed in a helical form with respect to the outer circumferential surface of the support ring 78. In such a case, when the piston rod 62 is displaced along the axial direction, a rotational force can be imparted with respect to the support ring 78, accompanied by the lubricant inside the lubricant groove 84 becoming agitated and applied effectively and suitably.

Figure 8A:
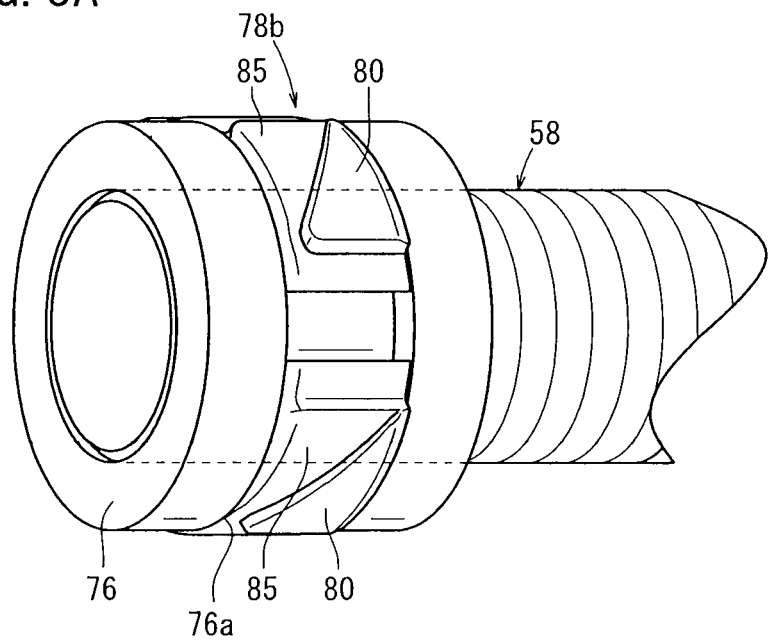
FIG. 8A is an enlarged cross sectional view showing a modified example of a support ring in which agitating grooves are provided for agitating a lubricant on an outer circumferential surface thereof.
Figure 8B:
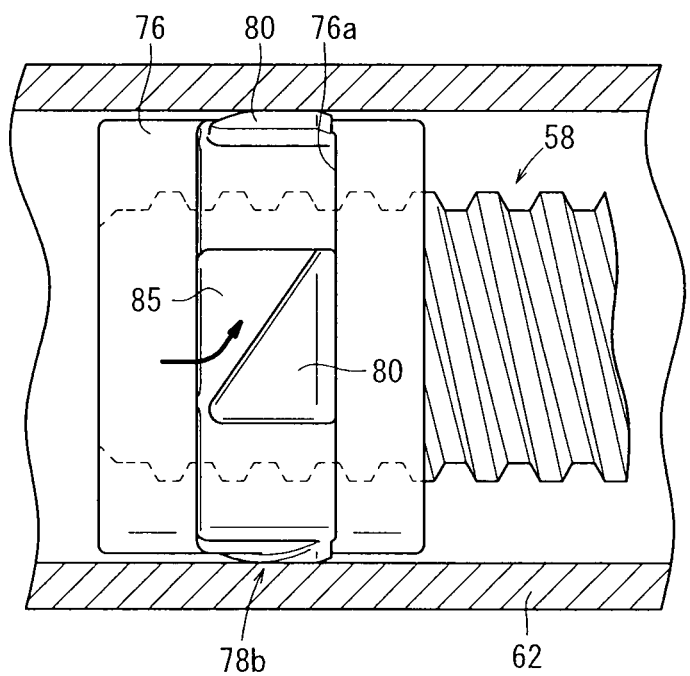
FIG. 8B is a plan view of the support ring shown in FIG. 8A.

Furthermore, as shown in FIGS. 8A and 8B, the support members 80 of the support ring (ring body) 78b may be provided with agitating grooves 85, which are inclined at a predetermined angle with respect to the axis of the support ring 78b, and further, are recessed at a predetermined depth with respect to the outer circumferential surface of the support members 80. Stated otherwise, the agitating grooves 85 are formed in triangular shapes dividing equally and occupying substantially the same amount of space on the support ring 78b as the support members 80. The agitating grooves 85 are disposed respectively with respect to the plurality of support members 80.

In addition, when the piston rod 62 is displaced along the axial direction (in the direction of arrows A and B in FIG. 2), the support ring 78b having the agitating grooves 85 thereon slides in contact with the inner circumferential surface of the piston rod 62, and due to the lubricant such as grease or the like entering inside of the agitating grooves 85 (refer to the arrow in FIG. 8B), the lubricant is guided in an oblique direction by the agitating grooves 85 with respect to the axis of the piston rod 62. More specifically, because the lubricant is supplied in a circumferential direction by the agitating grooves 85 accompanying displacement of the piston rod 62, lubrication can be carried out reliably and efficiently between the inner circumferential surface of the piston rod 62 and the support ring 78b. Stated otherwise, utilizing the displacement of the piston rod 62, the lubricant in the vicinity of the support ring 78b can favorably and effectively perform lubrication, while the lubricant is stirred (agitated) in a circumferential direction on the inside of the piston rod 62.

As a result, the lubricant can be applied uniformly and evenly between the piston rod 62 and the support ring 78b, thus enabling lubrication to be reliably carried out. Moreover, since deterioration of the lubricant can be prevented, durability can be enhanced.

The displacement nut 18 is formed in a cylindrical shape having a screw hole (not shown) in the center thereof along the axial direction. The screw shaft 58 is screw-engaged with the screw hole. Additionally, upon rotation of the screw shaft 58, the displacement nut 18 is displaced in the interior of the body 12 along the axial direction (the direction of arrows A and B).

Figure 9:
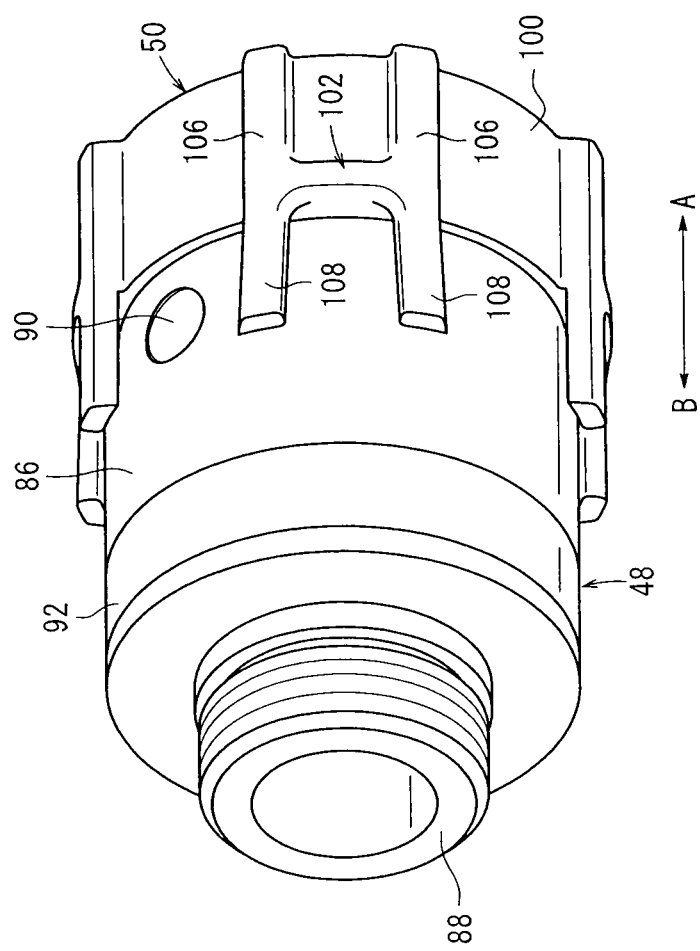
FIG. 9 is an exterior perspective view of a piston, having a rotation-stopping member installed on an outer circumferential surface thereof.
Figure 10:
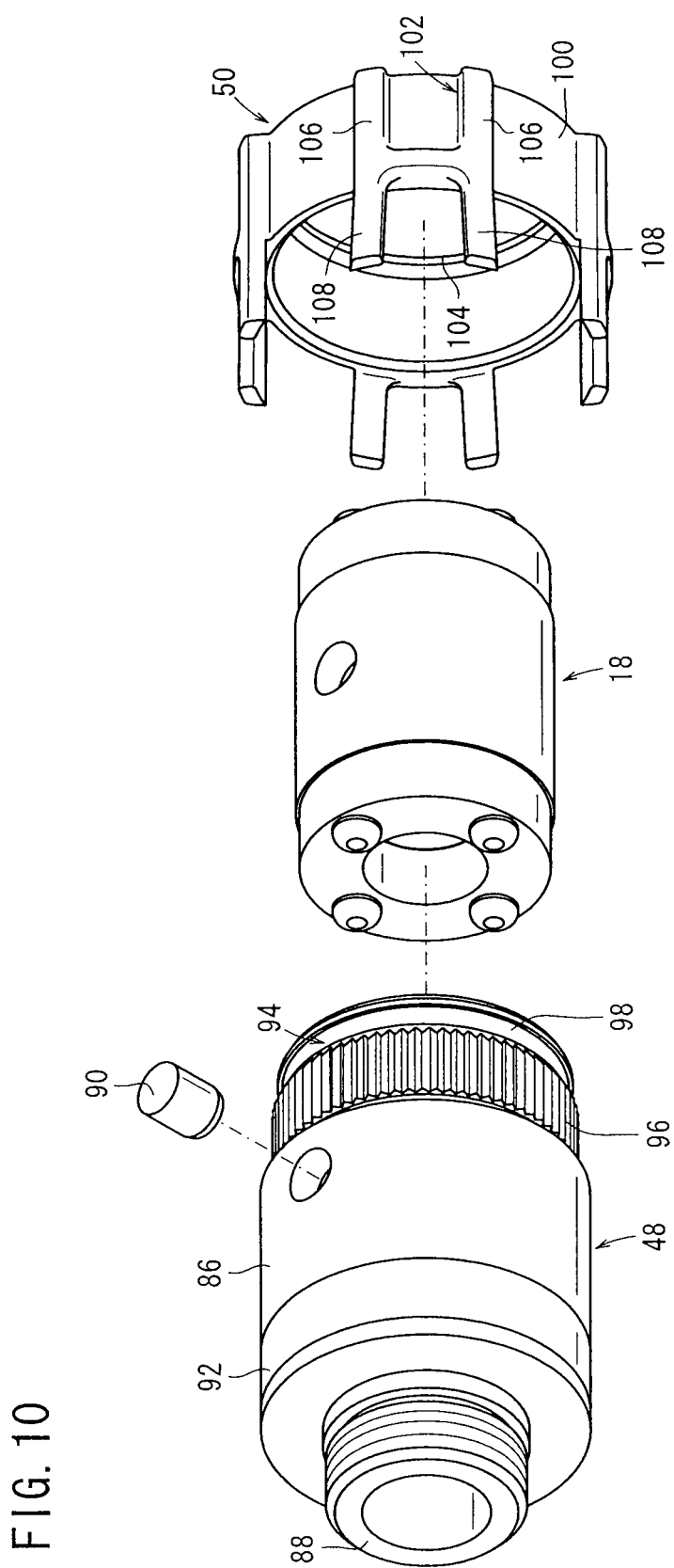
FIG. 10 is an exploded perspective view of the piston of FIG. 9, a displacement nut, and the rotation-stopping member.
Figure 11:
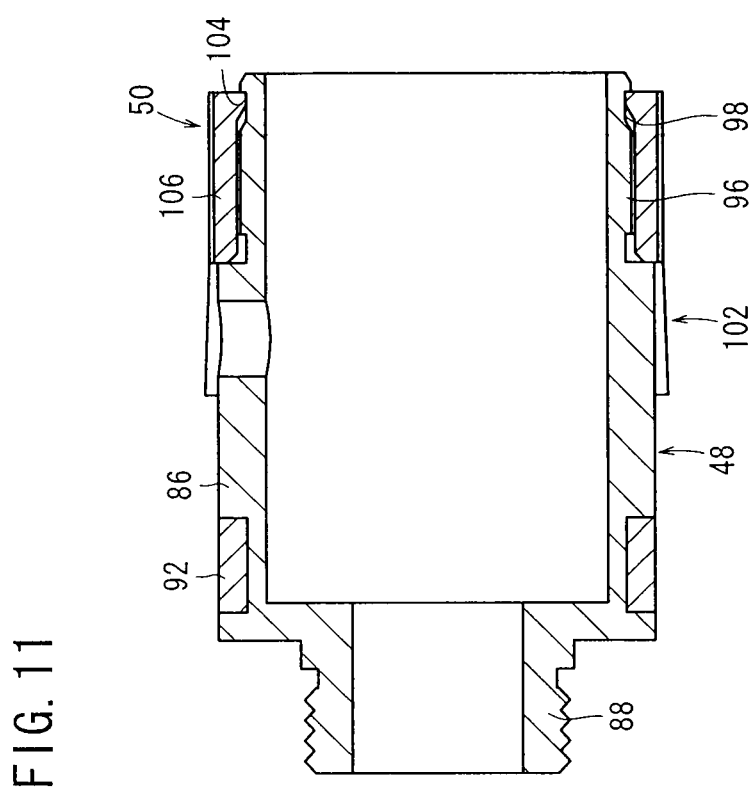
FIG. 11 is a vertical cross sectional view showing the piston of FIG. 9 and the rotation-stopping member.

As shown in FIGS. 9 through 11, the piston 48 includes a large diameter portion 86 formed in a cylindrical shape accommodating the displacement nut 18 thereinside, and a small diameter portion 88 disposed adjacent to the large diameter portion 86 and connected to the piston rod 62. Also, in a condition where the displacement nut 18 is inserted into the large diameter portion 86, the piston 48 and the displacement nut 18 are connected together by insertion of a latching pin 90 from an outer circumferential side thereof.

A magnet 92 is installed on the outer circumferential surface of the large diameter portion 86 through an annular groove, at a location on one side thereof (in the direction of arrow B) adjacent to the small diameter portion 88. A magnetic field produced by the magnet 92 is detected by a position detecting sensor (not shown) installed in a sensor groove 26 of the body 12, whereby the position of the piston 48 inside the electric actuator 10 can be confirmed.

Further, on the outer circumferential surface of the large diameter portion 86, a mounting recess 94 is formed, defined by a region thereof on one end side of the body 12 (in the direction of arrow A), which is recessed in a radial inward direction. On the circumferential surface thereof, a knurled portion (serrated portion) 96 is formed, having a plurality of knurls with an uneven (concave/convex) shape in the radial direction, and on the end of the large diameter portion 86 adjacent to the knurled portion 96, an annular engagement groove 98 is formed, which is recessed in diameter more so than the knurled portion 96. A portion of a rotation-stopping member 50 (described below) is mounted over the mounting recess 94 including the knurled portion 96 and the engagement groove 98.

The rotation-stopping member 50 is formed by injection molding from a resin material (e.g., fluorine resin) having a low sliding resistance, including a ring-shaped base section 100, and plural pairs of projections 102 that project therefrom in a radial outward direction.

The base section 100 is formed at a substantially constant diameter, and includes a radially inward projecting pawl 104 on the inner circumferential surface thereof. The pawl 104 is disposed on one end of the base section 100, having a substantially trapezoidal shape in cross section, gradually tapering along the radial inward direction of the base section 100.

The projections 102 include straight sections 106, which are rectangularly shaped in cross section and bulge outwardly in a radial outward direction with respect to the outer circumferential surface of the base section 100 while extending in straight lines along the axial direction of the base section 100, and spring sections 108 joined to ends of the straight sections 106 and which project for a predetermined length along the axial direction from the ends of the base section 100. The outer diameters of the straight sections 106 and the spring sections 108 are substantially the same, and the spring sections 108 are formed such that they are expanded gradually in a radial outward direction toward the ends thereof. More specifically, the spring sections 108 function as springs having elastic forces biased respectively in a radial outward direction.

Further, the projections 102 are provided in a pair separated at a predetermined interval along the outer circumferential surface of the base section 100. Four pairs of such projections 102 are disposed on the base section 100, separated mutually at equal intervals.

The rotation-stopping member 50 is inserted by press-fitting onto an outer circumferential side of the large diameter portion 86 on the piston 48, from an end side thereof on which the spring sections 108 are located. At this time, the spring sections 108 are arranged on the outer circumferential side of the large diameter portion 86, whereas the base section 100 including the straight sections 106 is installed in the mounting recess 94 and the pawl 104 is engaged in the engagement groove 98. As a result, displacement of the rotation-stopping member 50 in the axial direction is regulated, and the rotation-stopping member 50 becomes affixed with respect to the outer circumferential surface of the piston 48. Further, since the base section 100 is press-fitted over the knurled portion 96, displacement of the base section 100 in a rotational direction with respect to the piston 48 also is regulated.

More specifically, the rotation-stopping member 50 is installed integrally with the piston 48, in a state where displacement thereof in axial and rotational directions with respect to the piston 48 is regulated by the pawl 104, which is engaged in the engagement groove 98, and the base section 100, which is press-fitted onto the knurled portion 96. Stated otherwise, at all times, the rotation-stopping member 50 is displaced integrally with the piston 48, without being displaced relatively with respect to the piston 48.

When the rotation-stopping member 50 is inserted together with the piston 48 through the interior of the body 12, the pairs of projections 102 are inserted respectively through the grooves 46 of the body 12. Owing thereto, rotational displacement of the displacement nut 18 and the piston 48 including the rotation-stopping member 50 in the body 12 is prevented.

In greater detail, because the projections 102 are inserted inside the grooves 46 such that the spring sections 108 thereof are compressed in diameter in a radial inward direction, the elastic force of the spring sections 108 is imparted as an applied pressure biased in a radial outward direction with respect to wall surfaces of the grooves 46.

In addition, the rotation-stopping member 50 slides along the grooves 46 of the body 12 via the straight sections 106 and the spring sections 108 that make up the projections 102. Further, by forming the straight sections 106 and the spring sections 108, which slide along the grooves 46, to have the shape of an involute curve in cross section, loads imparted thereby in the direction of rotation can suitably be received.

The piston rod 62 is formed in a tubular shape having a predetermined length. One end of the piston rod 62 is threaded onto the small diameter portion 88 of the piston 48, whereas a block shaped socket 64 is installed in and seals the other end of the piston rod 62. The screw shaft 58 is accommodated inside the piston rod 62, so that the support ring 78 is positioned in sliding contact with the inner circumferential surface of the piston rod 62, and the rod packing 40 and bush 42 are disposed in sliding contact on the outer circumferential surface of the piston rod 62. Additionally, upon displacement of the piston 48, the piston rod 62 is displaced along the axial direction together with the piston 48, whereupon the piston rod 62 projects outwardly from the other end side (in the direction of arrow B) of the body 12.

Figure 13A:
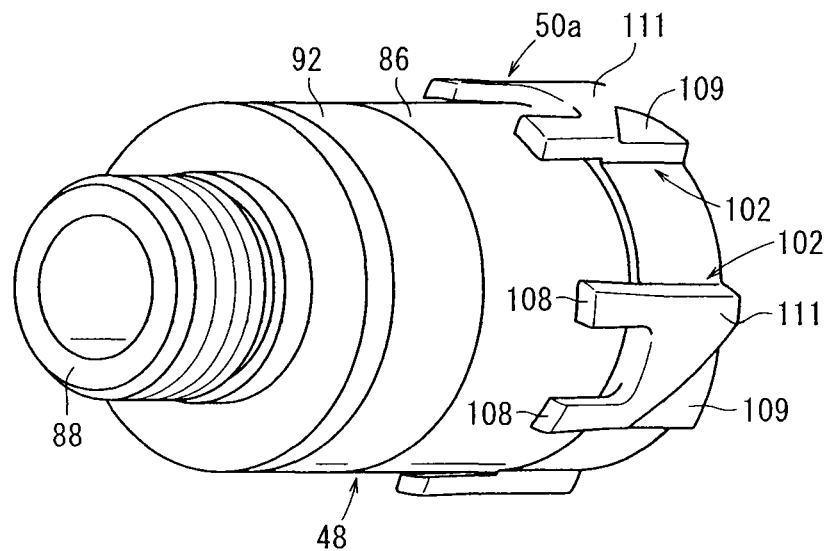
FIG. 13A is an enlarged cross sectional view showing a rotation-stopping member according to a modified example in which agitating grooves are provided on an outer circumferential surface thereof.
Figure 13B:
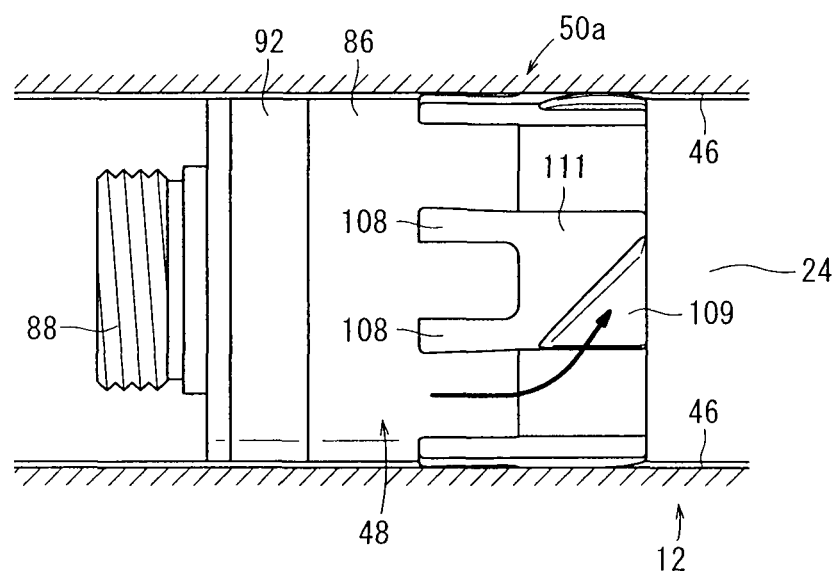
FIG. 13B is a plan view of the rotation-stopping member according to the modified example shown in FIG. 13A.

As shown in FIGS. 13A and 13B, agitating grooves 109, which are capable of agitating a lubricant such as grease or the like, may be provided on the projections 102 of the rotation-stopping member 50*a*. On the rotation-stopping member 50*a*, rectangularly shaped bulging portions 111 are formed, which bulge outwardly with respect to an outer circumferential surface of the base section 100, and a pair of spring sections 108 are joined respectively with respect to end portions thereof, extending along the axial direction. The agitating grooves 109 are inclined at a predetermined angle with respect to the axis of the rotation-stopping member 50*a* on the bulging portions 111, and further, are recessed at a predetermined depth with respect to the outer circumferential surface of the bulging portions 111. Stated otherwise, the agitating grooves 109 are formed in triangular shapes, recessed into the bulging portions 111.

In addition, when the rotation-stopping member 50*a* is displaced along the axial direction together with the piston 48, the lubricant such as grease or the like in the vicinity of the rotation-stopping member 50*a* enters into the agitating grooves 109 accompanying displacement of the rotation-stopping member 50*a*, and the lubricant is discharged in an oblique direction by the agitating grooves 109, which are inclined with respect to the axis of the piston 48. More specifically, because the lubricant is supplied in a circumferential direction in the hole 24 of the body 12 by the agitating grooves 109, lubrication can be carried out reliably and efficiently between the hole 24 of the body 12 and the rotation-stopping member 50a. Stated otherwise, utilizing the displacement of the piston 48, the lubricant in the vicinity of the rotation-stopping member 50a can favorably and effectively perform lubrication, while the lubricant is stirred (agitated) in a circumferential direction on the inside of the body 12.

As a result, the lubricant can be applied uniformly and evenly between the piston 48, the rotation-stopping member 50a and the body 12, thereby enabling lubrication to be reliably carried out. Moreover, since deterioration of the lubricant can be prevented, durability can be enhanced.

The drive force transmission mechanism 22, as shown in FIGS. 1 to 3, is accommodated inside the adapter 30 and the pulley cover 52, and includes a drive pulley 56 connected to the drive shaft 54a of the rotary drive source 54, a driven pulley 110 installed on the connector 66, which is connected to the screw shaft 58, and a timing belt 112 trained between the drive pulley 56 and the driven pulley 110. The drive pulley 56 is affixed in a state such that relative displacement thereof with respect to the drive shaft 54a is regulated by a bolt pin 114. The bolt pin 114 is screw-engaged in a central direction from the outer circumferential side of the drive pulley 56. The driven pulley 110, in a similar manner as the drive pulley 56, is affixed in a state such that relative displacement thereof with respect to the connector 66 is regulated by a bolt pin 114 which is screw-engaged in a central direction from the outer circumferential side of the driven pulley 110.

A plurality of gear teeth are disposed on outer circumferential surfaces of the drive pulley 56 and the driven pulley 110, and teeth provided on the inner circumferential surface of the timing belt 112 are enmeshed with gear teeth of the drive pulley 56 and the driven pulley 110. Consequently, the rotary drive force of the driving section 16 is transmitted from the drive pulley 56 to the driven pulley 110 through the timing belt 112, and the screw shaft 58 is rotated, whereby the displacement nut 18, which is threaded onto the screw shaft 58, is capable of being displaced in the axial direction (the direction of arrows A and B).

The electric actuator 10 according to the first embodiment of the present invention is constructed basically as described above. Next, operations and effects of the electric actuator 10 shall be explained. The condition shown in FIGS. 1 and 2, in which the piston rod 62 is accommodated inside the body 12, shall be described and referred to as an initial position.

In such an initial position, a current is supplied with respect to the driving section 16 from an unillustrated power source, whereby the drive pulley 56 is rotated through the drive shaft 54a of the rotary drive source 54, and the rotary drive force thereof is transmitted to the driven pulley 110 via the timing belt 112.

In addition, by rotation of the screw shaft 58, which is connected to the driven pulley 110, the displacement nut 18 is displaced together with the piston 48 toward the other end side (in the direction of arrow B) of the body 12. At this time, since the screw shaft 58 is rotatably supported by the first and second bearings 32, 72 through the connector 66 on one end side of the screw shaft 58, the screw shaft 58 is rotatably driven smoothly and with high precision, while the displacement nut 18 can be displaced along the axial direction.

Further, the rotation-stopping member 50 installed on the piston 48 is inserted through the grooves 46 of the body 12 via the projections 102. Owing thereto, rotational displacement of the piston 48 and the displacement nut 18 is regulated by the rotation-stopping member 50, and the piston 48 and the displacement nut 18 can be displaced only in the axial direction.

As a result, the piston 48 is displaced together with the piston rod 62, such that the other end side of the piston rod 62 gradually projects and is exposed outwardly from the other end of the body 12. At this time, because the inner circumferential side of the piston rod 62 is slidably supported by the support ring 78 in which the screw shaft 58 is disposed, the piston rod 62 can be displaced highly precisely coaxially with the screw shaft 58 at all times. Stated otherwise, when the piston rod 62 is displaced toward the other end side (in the direction of arrow B) of the body 12, the piston rod 62 is prevented from becoming off-centered with respect to the screw shaft 58.

Figure 14:
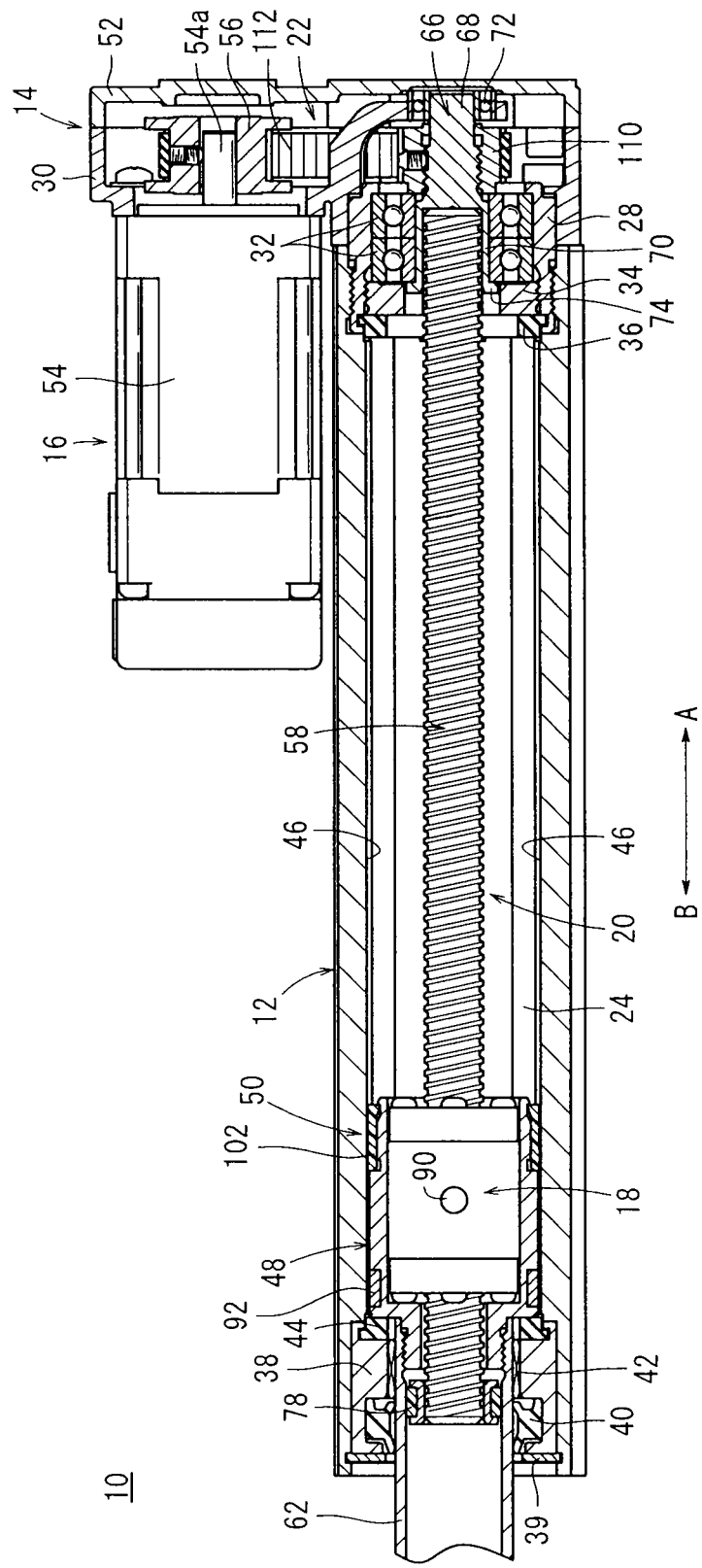
FIG. 14 is an overall cross sectional view showing a state in which the displacement nut and the piston are displaced to another end side of the body in the electric actuator of FIG. 1.

Further, as shown in FIG. 14, in a displacement terminal end position in which the piston 48 is displaced fully to the other end side of the body 12, an end surface of the piston 48 abuts against the second damper 44, whereby shocks imparted to the piston 48 are absorbed and buffered.

On the other hand, in the event that the piston rod 62 is displaced toward the one end side (in the direction of arrow A) of the body 12, the rotary drive source 54 of the driving section 16 is rotated in an opposite direction, and the driven pulley 110 also is rotated in an opposite direction through the drive pulley 56 and the timing belt 112. Consequently, upon rotation of the screw shaft 58, the displacement nut 18 and the piston 48 are displaced toward the one end side (in the direction of arrow A) of the body 12, accompanied by the piston rod 62 similarly being displaced toward the one end side (in the direction of arrow A) of the body 12, whereby the piston rod 62 gradually becomes accommodated inside the body 12. Further, as shown in FIG. 2, the displacement nut 18 and the piston 48 are restored to the initial position, displaced fully to the one end side of the body 12.

In the foregoing manner, according to the first embodiment, the connector 66 is coupled by shrink-fitting, by press-fitting or with by press-fitting with an adhesive or the like, to one end of the screw shaft 58 having threads on the outer circumferential surface thereof. Due to the connector 66 being rotatably supported by the first and second bearings 32, 72, it is unnecessary to perform processing beforehand at a location on the one end of the screw shaft 58 which is supported by the first and second bearings 32, 72.

More specifically, the connector 66, which is supported by the first and second bearings 32, 72, is formed as a separate member from the screw shaft 58 itself, and by mutually and integrally connecting the connector 66 and the screw shaft 58, it becomes possible to eliminate processing that heretofore has been implemented on the end of the screw shaft 58. Owing thereto, processing steps can be reduced, and productivity (ease in manufacturing) of the electric actuator 10 including the screw shaft 58 can be enhanced.

Further, the support ring 78 is disposed on the other end of the screw shaft 58, and on an outer circumferential surface thereof, the piston rod 62 is displaceably supported for displacement along the axial direction, whereby the other end of the screw shaft 58 is supported in a radial direction through the piston rod 62, and vibrations of the screw shaft 58 can be prevented. Consequently, in the electric actuator 10, even in the case of a "long stroke" specification, in which the displacement amount of the displacement nut 18 and the piston 48 taken in a lengthwise dimension along the axial direction of the screw shaft 58 (the direction of arrows A and B) is set to be large, the other end of the screw shaft 58 being bent in a radial direction, and the screw shaft 58 becoming off-centered with respect to the piston rod 62, are prevented.

Consequently, the displacement nut 18 and the piston 48 are capable of being displaced smoothly and highly precisely. Further, even in the case that the screw shaft 58 is rotated at high speeds, since flexing of the screw shaft 58 can be prevented by the support ring 78, the displacement nut 18 and the piston 48 can be smoothly displaced with high precision.

Furthermore, a rotation-stopping member 50 is disposed through a recess on the outer circumferential surface of the piston 48, and the rotation-stopping member 50 is inserted through the grooves 46 of the body 12, and together therewith, the spring sections 108 disposed on the rotation-stopping member 50 can apply a pressing force (applied pressure) in a radial outward direction with respect to the grooves 46. Owing thereto, rattling of the rotation-stopping member 50 and the piston 48 with respect to the body 12 can reliably be prevented, and while the piston 48 and the displacement nut 18 are displaced in the axial direction upon rotation of the screw shaft 58, rotational displacement thereof is prevented and the piston 48 and the displacement nut 18 can be smoothly displaced along the axial direction.

Further, by cutting the screw shaft 58, which is prefabricated and formed beforehand with a given longitudinal dimension, to a desired length corresponding to the stroke displacement amount of the piston 48, and by joining an end thereof to the connector 66, the displacement mechanism 20 including the screw shaft 58 can conveniently and easily be fabricated. Consequently, compared to a conventional electric actuator, in which screw shafts are formed respectively at given lengths responsive to the stroke length of the electric actuator and are kept in storage for the purpose of providing a location on the end of the screw shaft that is supported by bearings, productivity (ease in manufacturing) of the screw shaft 58 constituting the electric actuator 10 can significantly be improved.

Figure 15:
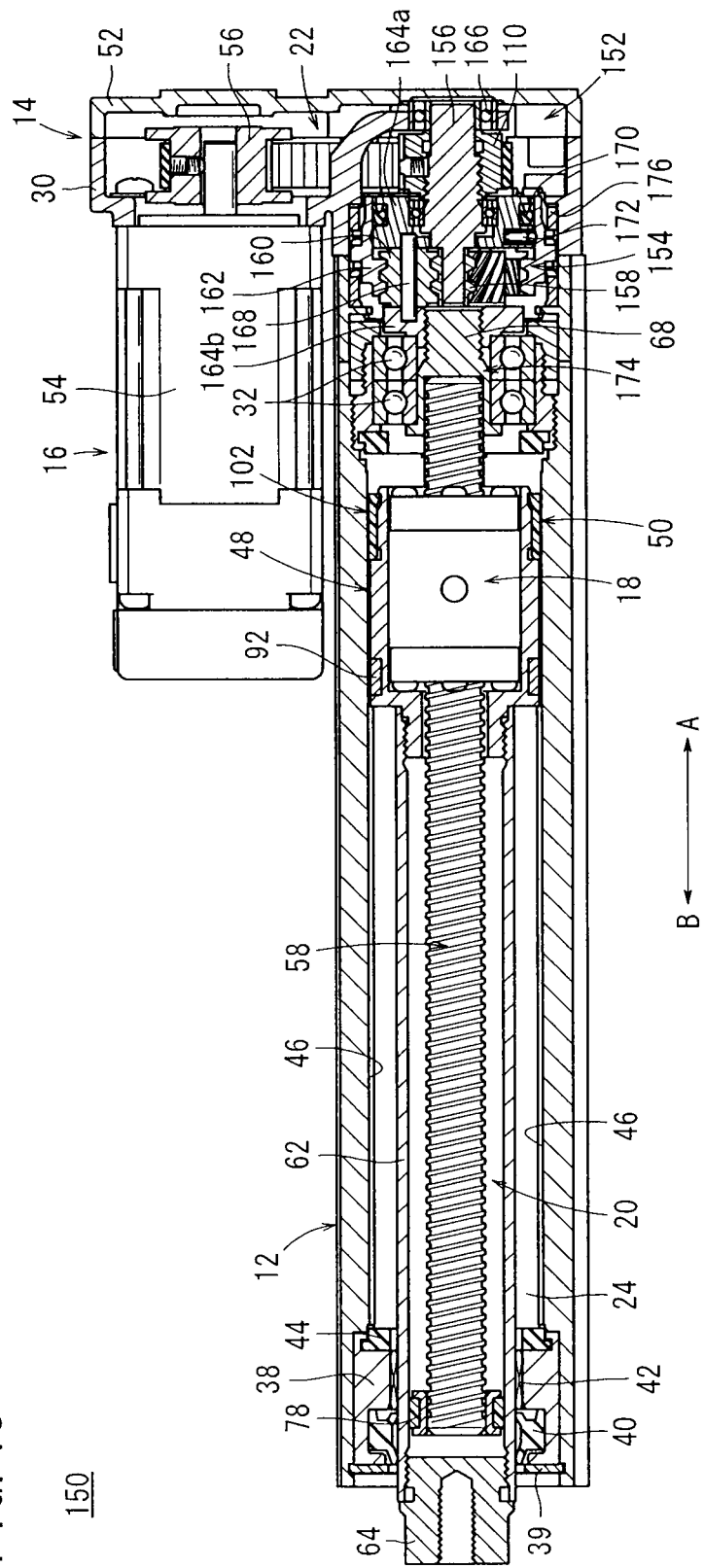
FIG. 15 is an exterior perspective view of an electric actuator according to a second embodiment of the present invention.
Figure 16:
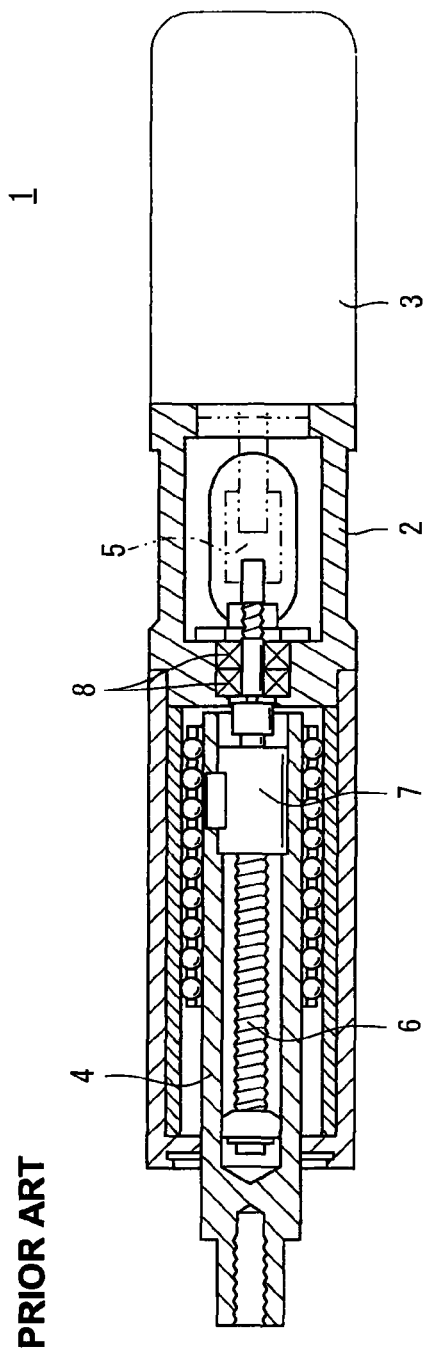
FIG. 16 is an overall cross sectional view of an electric actuator according to a conventional technique.

Next, an electric actuator 150 according to a second embodiment is shown in FIG. 15. Structural elements thereof, which are the same as those of the electric actuator 10 according to the first embodiment of the present invention, are designated using the same reference numerals and detailed explanations of such features shall be omitted.

As shown in FIG. 15, the electric actuator 150 according to the second embodiment differs from the electric actuator 10 according to the first embodiment, in that it is equipped with a variable speed unit (variable speed transmission mechanism) 152, which is capable of changing the speed of the drive force transmitted to the displacement mechanism 20 from the driving section 16.

The variable speed unit 152 is disposed on one end of the body 12 and is made up from a planetary gear mechanism 154, which is arranged such that a portion thereof is accommodated inside the cover unit 14. The planetary gear mechanism 154 includes an input shaft 156 on which the driven pulley 110 of the drive force transmission mechanism 22 is installed, a sun gear 158 disposed on an end of the input shaft 156, planet gears 160 that both revolve and rotate and which are enmeshed with and separated mutually by equal angles along a circumferential direction of the sun gear 158, an internal gear 162, and carriers 164a, 164b. The input shaft 156 is supported rotatably by a second bearing 166.

The planet gears 160 are axially supported rotatably on the carriers 164a, 164b through pins 168, and on the outer circumferential sides of the planet gears 160, a large diameter internal gear 162 is fitted, such that the planet gears 160 are enmeshed with inner teeth engraved along the inner circumference of the internal gear 162. The input shaft 156 is disposed coaxially with the piston 48 and the screw shaft 58 constituting the displacement mechanism 20. The sun gear 158, the planet gears 160, and the internal gear 162 are made up of helical gears, respectively.

Further, on an outer circumference of the carrier 164a disposed on the side of the input shaft 156, a packing 170 that acts as a resistor is mounted through an annular groove in sliding contact with the inner circumferential surface of the internal gear 162. A ball that constitutes a ball plunger 172 abuts against the inner circumferential surface of the internal gear 162 under the elasticity of a spring, thereby urging the internal gear 162 in a radial outward direction.

On the other hand, the shaft 68 of a connector 174 is screw-engaged with and connected integrally to an inner circumferential side of the carrier 164b, which is disposed on the side of the first bearings 32. More specifically, upon rotation of the carrier 164b, the screw shaft 58 is rotated via the connector 174.

A lockup ring 176 is disposed on the outer circumferential side of the internal gear 162, which functions as a locking mechanism for the internal gear 162.

In this manner, by providing the variable speed unit 152 in the electric actuator 150 according to the second embodiment, after the rotary drive force from the driving section 16 has been suitably changed in speed through the planetary gear mechanism 154 that constitutes the variable speed unit 152, the rotary drive force is transmitted to the displacement mechanism 20, whereby the piston 48 and the piston rod 62 can be displaced at a desired velocity and displacement amount.

The electric actuator according to the present invention is not limited to the above-described embodiments, and it is a matter of course that various modified or additional structures could be adopted without deviating from the essence and gist of the invention as set forth in the appended claims.

What is claimed is:

1. An electric actuator comprising:
   a body extending along an axial direction;
   a driving section driven rotatably under supply of an electric current thereto;
   a drive force transmission mechanism connected to the driving section for transmitting a drive force from the driving section;
   a displacement mechanism disposed on the body and including a screw shaft, which is rotatably displaced by the drive force transmitted through the drive force transmission mechanism, and a displacement member, which is screw-engaged with the screw shaft and displaced along an axial direction of the body;
   a connecting member coupled to one end of the screw shaft and connected to the drive force transmission mechanism by being rotatably supported by first and second bearings;
   a support mechanism for supporting the screw shaft in a radial direction; and
   a rotation regulating mechanism formed separate and detachable from the displacement member and fitted onto an outer circumferential surface of the displacement member, which is engaged in a groove of the body and regulates rotational displacement of the displacement member, the rotation regulating mechanism including a ring-shaped base portion and plural pairs of projections that project from the ring-shaped base portion along the axial direction to extend from the ring-shaped base portion along the axial direction, each projection including a first section contacting the ring-shaped base portion and a second section projecting along the axial direction beyond the ring-shaped base portion, wherein the support mechanism is disposed on an end of the screw shaft opposite to the end of the screw shaft to which the connecting member is coupled.

2. The electric actuator according to claim 1, wherein the support mechanism comprises a ring body that is disposed rotatably with respect to the screw shaft, wherein the ring body is slidably disposed inside an inner circumferential surface of a rod coupled to the displacement member.

3. The electric actuator according to claim 2, wherein the ring body is retained in a holder disposed on an inner circumferential side of the ring body, and the holder is affixed by shrink-fitting or press-fitting with respect to the screw shaft.

4. The electric actuator according to claim 2, wherein a space is provided between the ring body and an inner circumferential surface of the rod.

5. The electric actuator according to claim 3, wherein the ring body includes a plurality of support members projecting in a radial outward direction from an outer circumferential surface of the holder, the support members being separated at equal intervals along a circumferential direction of the ring body.

6. The electric actuator according to claim 3, wherein a groove in which the ring body is rotatably disposed is formed on an outer circumferential surface of the holder.

7. The electric actuator according to claim 5, wherein an annular shaped lubricant groove recessed with respect to an outer circumferential surface of the support members, and which extends along the circumferential direction of the ring body, is formed in the support members, wherein a lubricant is filled into the lubricant groove.

8. The electric actuator according to claim 5, wherein agitating grooves are formed on the support members, which are inclined at a predetermined angle with respect to an axis of the ring body, and are recessed with respect to an outer circumferential surface of the support members.

9. The electric actuator according to claim 1, wherein the connecting member is affixed by shrink-fitting or press-fitting and bonding with respect to the screw shaft.

10. The electric actuator according to claim 9, wherein the connecting member includes a flange that projects in a radial outward direction, the flange regulating displacement of the bearings along an axial direction of the bearings.

11. The electric actuator according to claim 1, wherein the rotation regulating mechanism comprises:
a base section installed on the outer circumferential surface of the displacement member; and
projections that project in a radial outward direction with respect to the outer circumferential surface of the displacement member and an outer circumferential surface of the base section, and which extend along an axial direction of the displacement member,
wherein the projections include spring sections, which are biased in a radial outward direction with respect to the displacement member.

12. The electric actuator according to claim 11, wherein the base section is press-fitted over the outer circumferential surface of the displacement member, a serrated portion being formed on the outer circumferential surface, which is formed with a convex/concave serrated shape in a radial direction, along a circumferential direction thereof.

13. The electric actuator according to claim 11, wherein the projections are press-fitted into grooves of the body such that the spring sections are reduced in diameter in a radial inward direction, and a resilient force of the spring sections is biased in a radial outward direction with respect to wall surfaces of the grooves.

14. The electric actuator according to claim 11, wherein agitating grooves are formed on the projections, which are inclined at a predetermined angle with respect to an axis of the base section, and recessed with respect to an outer circumferential surface of the projections.

15. The electric actuator according to claim 1, wherein a variable speed transmission mechanism is disposed in the body, which is capable of varying a speed of rotation of the screw shaft transmitted to the displacement mechanism from the driving section through the drive force transmission mechanism.

16. An electric actuator comprising:
a body;
a driving section driven rotatably under supply of an electric current thereto;
a drive force transmission mechanism connected to the driving section for transmitting a drive force from the driving section;
a displacement mechanism disposed on the body and including a screw shaft, which is rotatably displaced by the drive force transmitted through the drive force transmission mechanism, and a displacement member, which is screw-engaged with the screw shaft and displaced along an axial direction of the body;
a connecting member coupled to one end of the screw shaft and connected to the drive force transmission mechanism by being rotatably supported by first and second bearings;
a support mechanism for supporting the screw shaft in a radial direction; and
a rotation regulating mechanism fitted onto an outer circumferential surface of the displacement member, which is engaged in a groove of the body and regulates rotational displacement of the displacement member, the rotation regulating mechanism including a ring-shaped base portion and plural pairs of projections that project from the ring-shaped base portion,
wherein the support mechanism is disposed on an end of the screw shaft opposite to the end of the screw shaft to which the connecting member is coupled,
wherein the support mechanism comprises a ring body that is disposed rotatably with respect to the screw shaft, wherein the ring body is slidably disposed inside an inner circumferential surface of a rod coupled to the displacement member,
wherein the ring body is retained in a holder disposed on an inner circumferential side of the ring body, and the holder is affixed by shrink-fitting or press-fitting with respect to the screw shaft,
wherein the ring body includes a plurality of support members projecting in a radial outward direction from an outer circumferential surface of the holder, the support members being separated at equal intervals along a circumferential direction of the ring body.

17. The electric actuator according to claim 16, wherein a space is provided between the ring body and an inner circumferential surface of the rod.

18. The electric actuator according to claim 16, wherein a groove in which the ring body is rotatably disposed is formed on an outer circumferential surface of the holder.

19. The electric actuator according to claim 16, wherein an annular shaped lubricant groove recessed with respect to an outer circumferential surface of the support members, and which extends along the circumferential direction of the ring body, is formed in the support members, wherein a lubricant is filled into the lubricant groove.

20. The electric actuator according to claim 16, wherein agitating grooves are formed on the support members, which are inclined at a predetermined angle with respect to an axis of the ring body, and are recessed with respect to an outer circumferential surface of the support members.

21. The electric actuator according to claim 16, wherein the connecting member is affixed by shrink-fitting or press-fitting and bonding with respect to the screw shaft.

22. The electric actuator according to claim 21, wherein the connecting member includes a flange that projects in a radial outward direction, the flange regulating displacement of the bearings along an axial direction of the bearings.

23. An electric actuator, comprising:
a body;
a driving section driven rotatably under supply of an electric current thereto;
a drive force transmission mechanism connected to the driving section for transmitting a drive force from the driving section;
a displacement mechanism disposed on the body and including a screw shaft, which is rotatably displaced by the drive force transmitted through the drive force transmission mechanism, and a displacement member, which is screw-engaged with the screw shaft and displaced along an axial direction of the body;
a connecting member coupled to one end of the screw shaft and connected to the drive force transmission mechanism by being rotatably supported by first and second bearings;
a support mechanism for supporting the screw shaft in a radial direction; and
a rotation regulating mechanism fitted onto an outer circumferential surface of the displacement member, which is engaged in a groove of the body and regulates rotational displacement of the displacement member, the rotation regulating mechanism including a ring-shaped base portion and plural pairs of projections that project from the ring-shaped base portion,
wherein the support mechanism is disposed on an end of the screw shaft opposite to the end of the screw shaft to which the connecting member is coupled,
wherein the rotation regulating mechanism comprises:
a base section installed on the outer circumferential surface of the displacement member; and
projections that project in a radial outward direction with respect to the outer circumferential surface of the displacement member and an outer circumferential surface of the base section, and which extend along an axial direction of the displacement member,
wherein the projections include spring sections, which are biased in a radial outward direction with respect to the displacement member.

24. The electric actuator according to claim 23, wherein the base section is press-fitted over the outer circumferential surface of the displacement member, a serrated portion being formed on the outer circumferential surface, which is formed with a convex/concave serrated shape in a radial direction, along a circumferential direction thereof.

25. The electric actuator according to claim 23, wherein the projections are press-fitted into grooves of the body such that the spring sections are reduced in diameter in a radial inward direction, and a resilient force of the spring sections is biased in a radial outward direction with respect to wall surfaces of the grooves.

26. The electric actuator according to claim 23, wherein agitating grooves are formed on the projections, which are inclined at a predetermined angle with respect to an axis of the base section, and recessed with respect to an outer circumferential surface of the projections.

27. The electric actuator according to claim 16, wherein a variable speed transmission mechanism is disposed in the body, which is capable of varying a speed of rotation of the screw shaft transmitted to the displacement mechanism from the driving section through the drive force transmission mechanism.

* * * * *